(12) United States Patent
Ozaki

(10) Patent No.: US 6,483,649 B2
(45) Date of Patent: Nov. 19, 2002

(54) ZOOM LENS SYSTEM

(75) Inventor: Hiroyasu Ozaki, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,798

(22) Filed: Dec. 26, 2000

(65) Prior Publication Data
US 2001/0006433 A1 Jul. 5, 2001

(30) Foreign Application Priority Data
Dec. 27, 1999 (JP) .......................... 11-371586

(51) Int. Cl.[7] .............................. G02B 15/14
(52) U.S. Cl. .................. 359/690; 359/687; 359/686
(58) Field of Search ....................... 359/690, 687, 359/686, 689, 684, 683

(56) References Cited

U.S. PATENT DOCUMENTS

| | | | |
|---|---|---|---|
| 4,348,082 A | 9/1982 | Ogawa | 359/677 |
| 4,501,475 A | * 2/1985 | Fujita et al. | 359/683 |
| 5,347,399 A | 9/1994 | Yoneyama et al. | 359/690 |
| 5,530,594 A | 6/1996 | Shibayama | 359/690 |
| 5,543,969 A | 8/1996 | Ito | 359/690 |
| 5,912,771 A | 6/1999 | Ozaki et al. | 359/690 |

* cited by examiner

Primary Examiner—Georgia Epps
Assistant Examiner—Timothy J Thompson
(74) Attorney, Agent, or Firm—Greenblum & Bernstein, P.L.C.

(57) ABSTRACT

A zoom lens system includes a first lens group, a second lens group, and a third lens group. At least the first and third lens groups move along the optical axis for zooming. The second lens group includes at least one negative lens element, and the zoom lens system satisfies the following conditions:

$0.65 < fw/f1 < 0.80$     (1)

$1.73 < N2n < 1.85$     (2)

$0.15 < X3/fw < 0.21$     (3)

$-0.05 < X2/X1 < 0.10$     (4)

wherein fw designates the focal length of the entire zoom lens system; f1 designates the focal length of the first lens group; N2n designates the average refractive index of the negative lens elements in the second lens group; X3 designates the traveling distance of the third lens group; X2 designates the traveling distance of the second lens group; X1 designates the traveling distance of the first lens group.

12 Claims, 14 Drawing Sheets

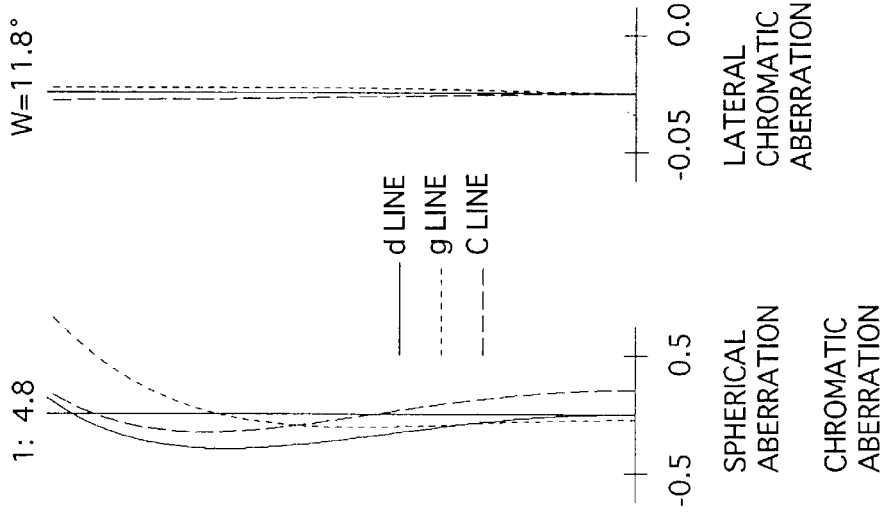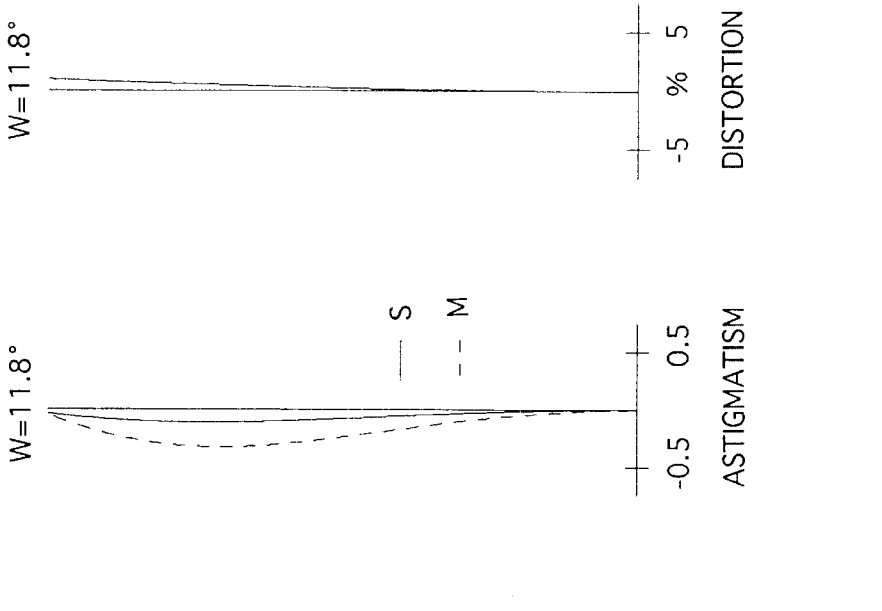

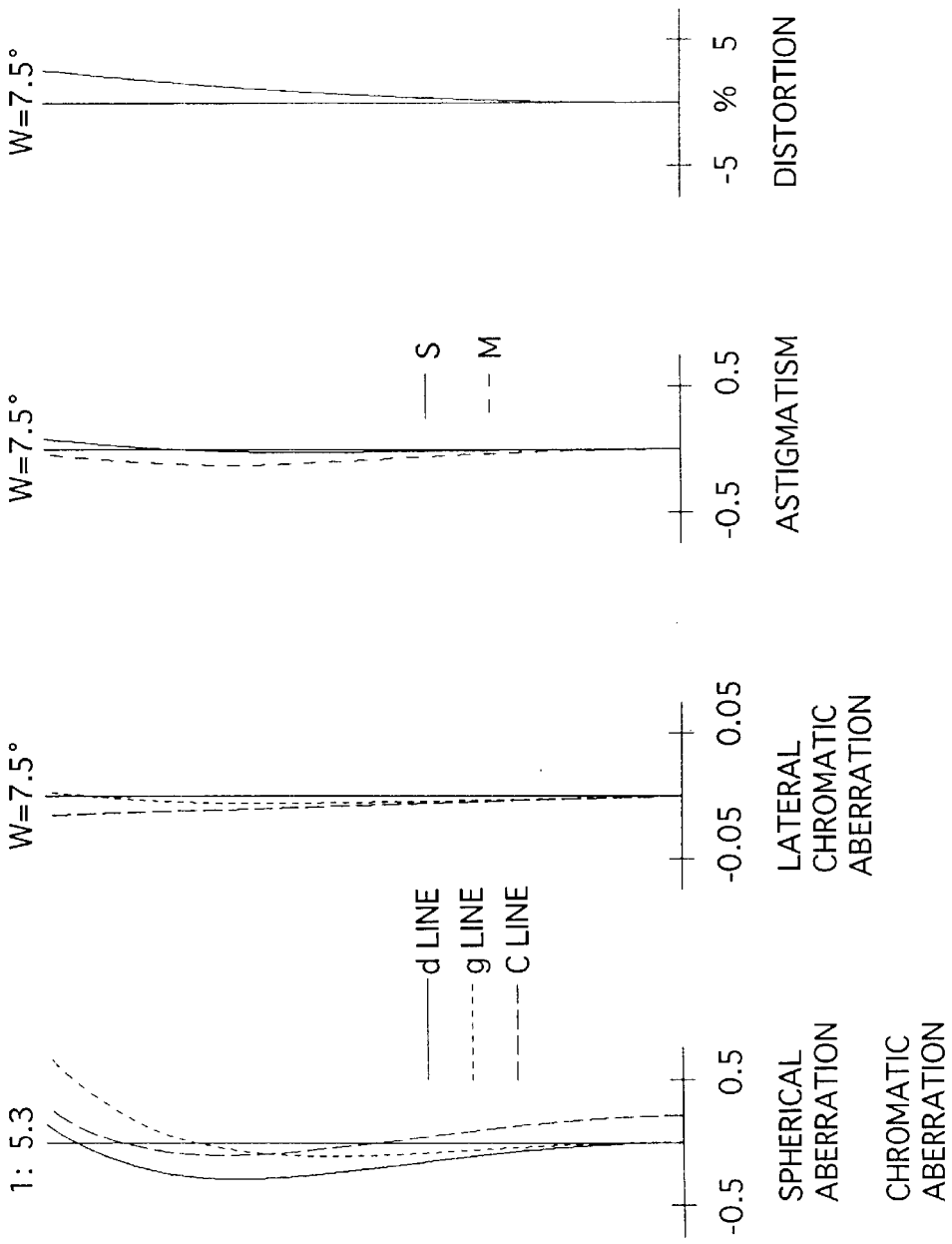

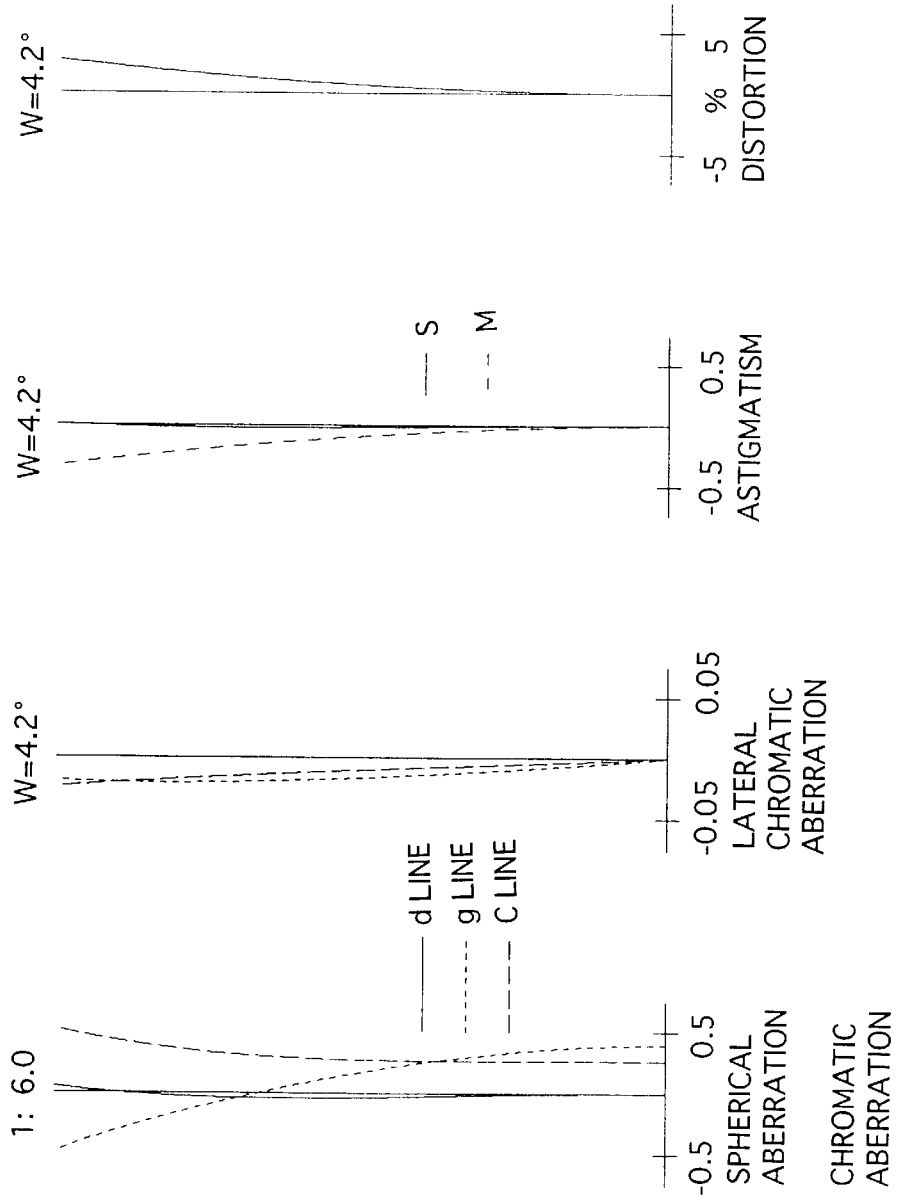

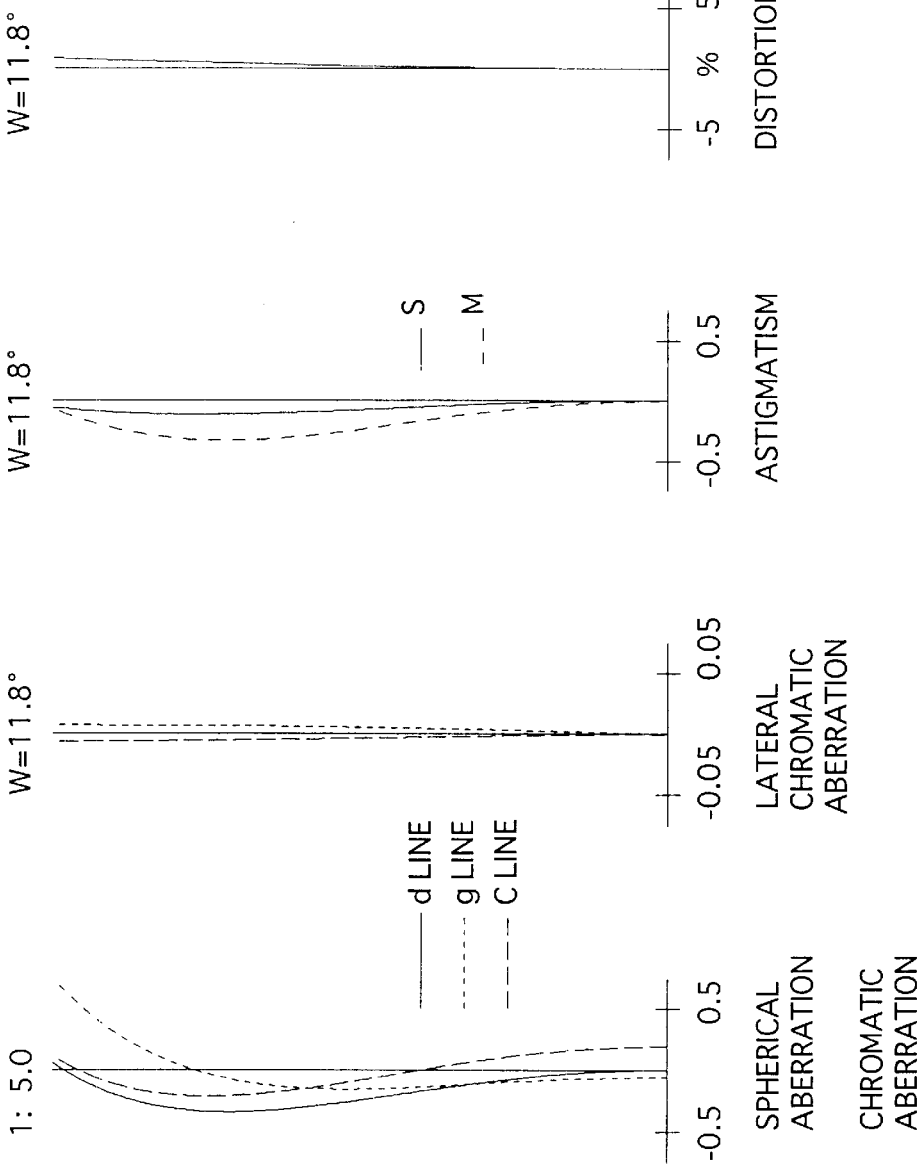

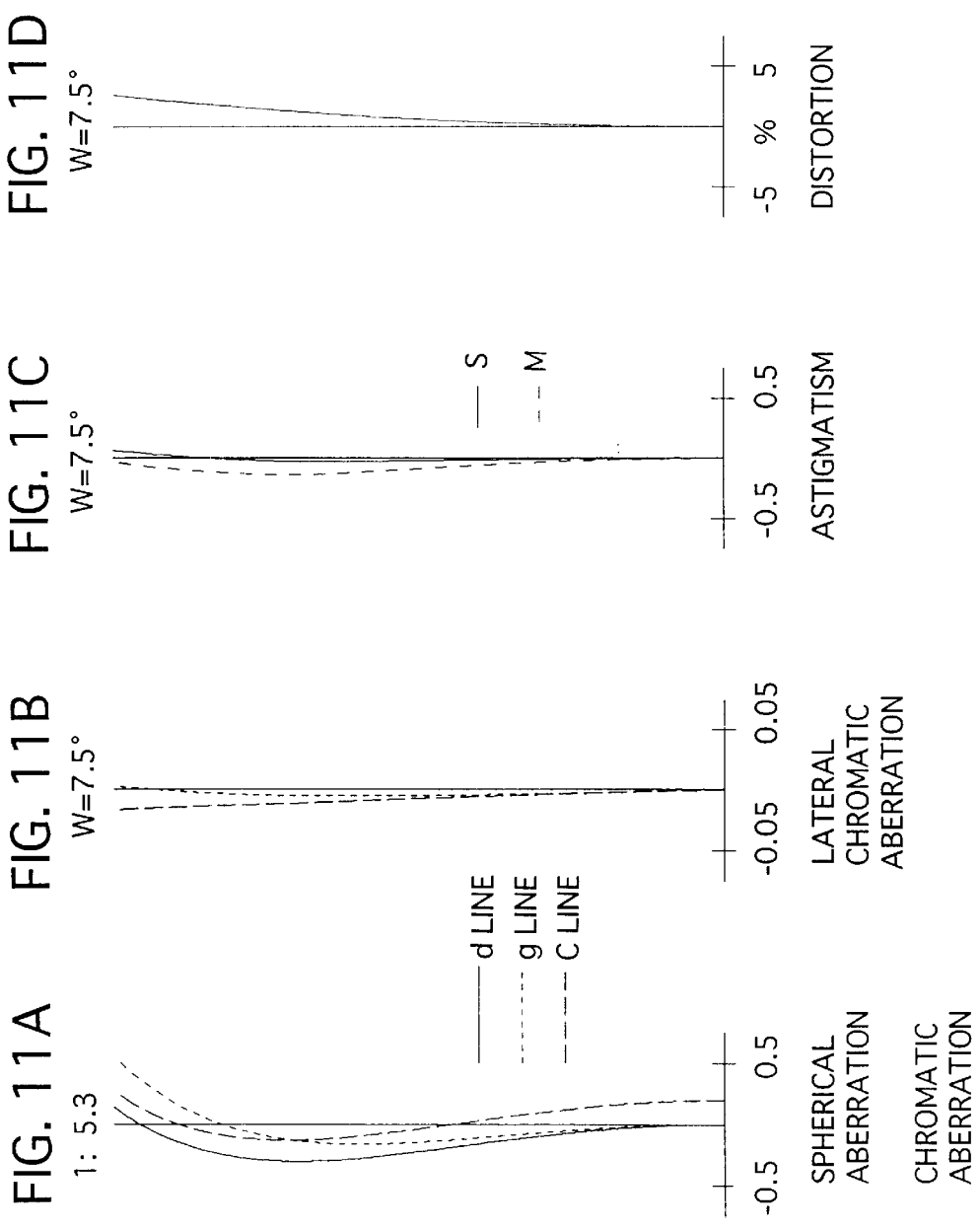

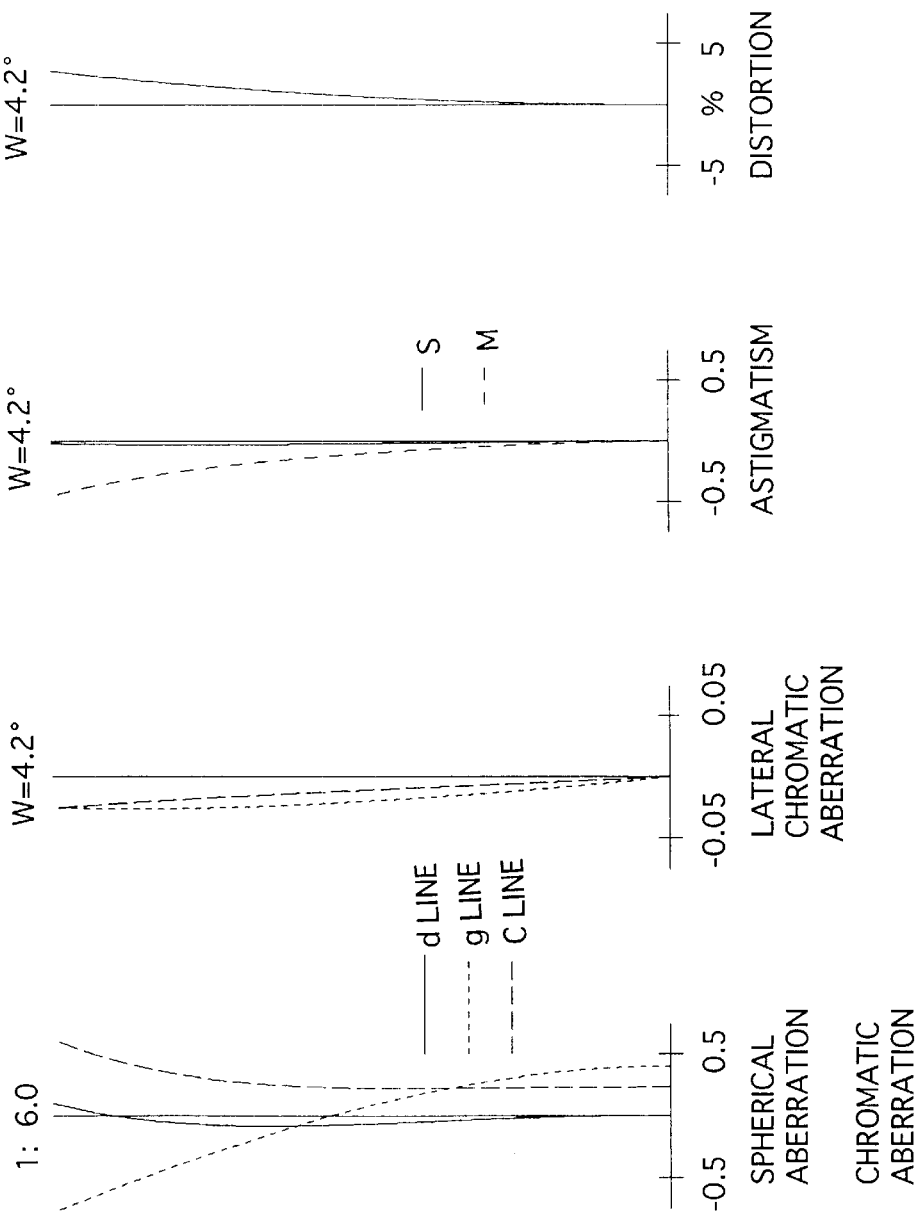

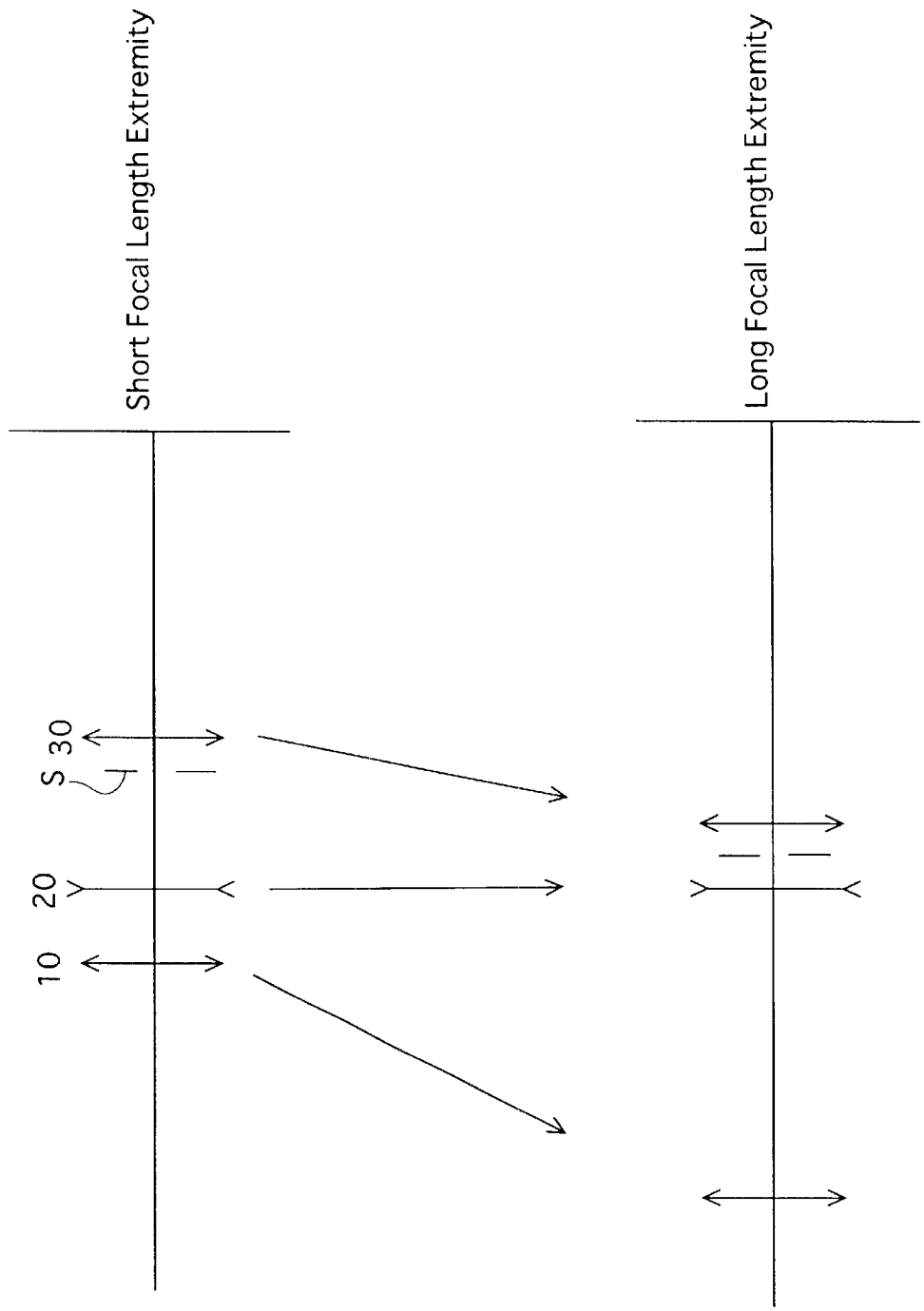

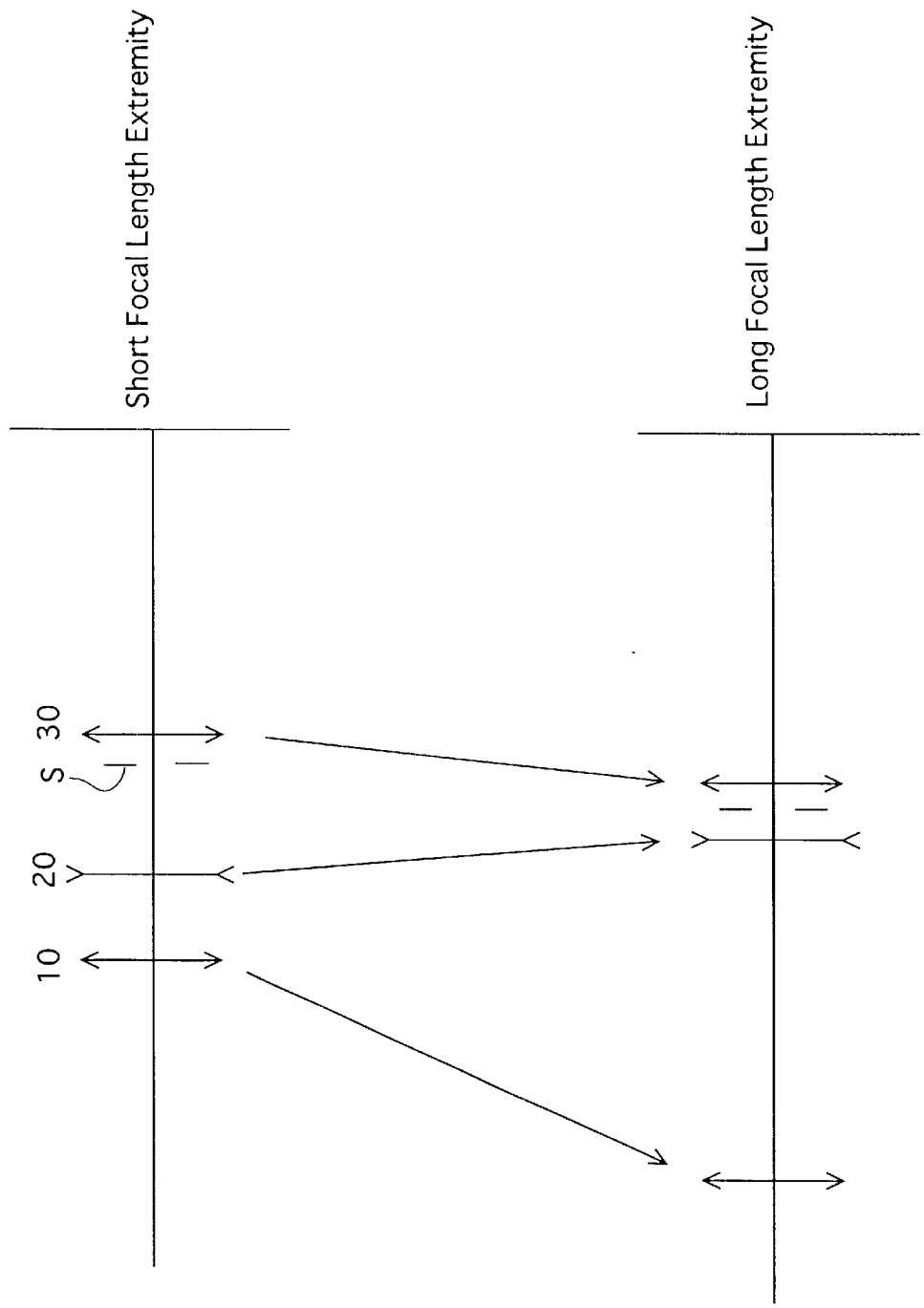

ZOOM LENS SYSTEM

BACKGROUND OF THE INVENTION

1. Field of the Invention

The present invention relates to a zoom lens system, and in particular, relates to a telephoto zoom lens system which has a zoom ratio of about 2.5 to 3.0, the angle of view of less than 10° at the long focal length extremity, and is mainly used for a single lens reflex (SLR) camera.

2. Description of the Related Art

Telephoto zoom lens systems with a zoom ratio of about 3.0 have been known from, for example, the U.S. Pat. No. 5,347,399, and U.S. Pat. No. 5,530,594. In the U.S. Pat. No. 5,347,399, the telephoto zoom lens system includes a positive first lens group, a negative second lens group, and a positive third lens group, in this order from the object, and the first lens group is stationary while the second and third lens groups are moved upon zooming. In such a zoom lens system, the entire length thereof is advantageously maintained constant upon zooming; however, the entire length of the lens system cannot be made short, which is unsuitable for miniaturization.

Furthermore, the telephoto zoom lens system taught in the U.S. Pat. No. 5,530,594 likewise has a positive first lens group, a negative second lens group, and a positive third lens group, in this order from the object; however, each lens group is moved independently of each other upon zooming. In such a zoom lens system, since zooming is performed by moving all of the lens groups independently, freedom in the optical design thereof is increased, so that the correcting of aberrations, and miniaturization of the lens system can be advantageously attained. On the other hand, the embodiments of the U.S. Pat. No. 5,530,594 have disclosed thirteen lens elements, which is relatively large, so that difficulties arise in reducing the cost of the lens system. Furthermore, the traveling distance of the second lens group is relatively long, which has made the structure of the lens frame complicated.

SUMMARY OF THE INVENTION

It is an object of the present invention to provide a miniaturized telephoto zoom lens system which has a zoom ratio of about 2.5 to 3.0, the angle of view of less than 10° at the long focal length extremity, a simple structure, and is produced at a low cost.

In order to achieve the above-mentioned object, there is provided a zoom lens system including a positive first lens group, a negative second lens group, and a positive third lens group, in this order from the object. At least the first lens group and the third lens group are moved along the optical axis to perform zooming. The second lens group includes at least one negative lens element, and the zoom lens system satisfies the following conditions:

$$0.65 < fw/f1 < 0.80 \quad (1)$$

$$1.73 < N2n < 1.85 \quad (2)$$

$$0.15 < X3/fw < 0.21 \quad (3)$$

$$-0.05 < X2/X1 < 0.10 \quad (4)$$

wherein fw designates the focal length of the entire zoom lens system at the short focal length extremity;

f1 designates the focal length for the first lens group;

N2n designates the average refractive index, with respect to the d-line, of the negative lens elements in the second lens group;

X3 designates the traveling distance, upon zooming, of the third lens group from the short focal length extremity towards the long focal length extremity, under the condition that the direction from the image plane towards the object is defined as the positive direction;

X2 designates the traveling distance, upon zooming, of the second lens group from the short focal length extremity towards the long focal length extremity, under the condition that the direction from the image plane towards the object is defined as the positive direction;

X1 designates the traveling distance, upon zooming, of the first lens group from the short focal length extremity to the long focal length extremity, under the condition that the direction from the image plane towards the object is defined as the positive direction.

It is preferable that the second lens group be stationary upon zooming. According to this arrangement, only the first and third lens groups are the moveable lens groups, so that a frame structure for supporting the lens groups can be simplified.

The first lens group is preferably constituted by a three-lens-element arrangement in which a positive single lens element, a negative single lens element and a positive single lens element are provided, in this order from the object; and the first lens group satisfies the following condition:

$$62 < v1p \quad (5)$$

wherein v1p designates the average Abbe number of the positive lens elements in the first lens group.

Furthermore, the most image-side lens element in the third lens group includes a negative meniscus lens element having the concave surface facing towards the object, and the third lens group preferably satisfies the following condition:

$$-0.90 < f3/f3end < -0.65 \quad (6)$$

wherein f3 designates the focal length of the third lens group; and f3end designates the focal length of the most image-side lens element in the third lens group.

The present disclosure relates to subject matter contained in Japanese Patent Application No. Hei-11-371586 (filed on Dec. 27, 1999) which is expressly incorporated herein by reference in its entirety.

BRIEF DESCRIPTION OF THE DRAWINGS

The invention will be discussed below in detail with reference to the accompanying drawings, in which:

FIGS. 6A, 6B, 6C and 6D show aberrations, at the short focal length extremity, occurred in the lens arrangement shown in FIG. 5;

FIGS. 7A, 7B, 7C and 7D show aberrations, at an intermediate focal length, of the lens arrangement shown in FIG. 5;

FIGS. 8A, 8B, 8C and 8D show aberrations, at the long focal length extremity, of the lens arrangement shown in FIG. 5;

FIGS. 10A, 10B, 10C and 10D show aberrations, at the short focal length extremity, occurred in the lens arrangement shown in FIG. 9;

FIGS. 11A, 11B, 11C and 11D show aberrations, at an intermediate focal length, of the lens arrangement shown in FIG. 9;

FIGS. 12A, 12B, 12C and 12D show aberrations, at the long focal length extremity, of the lens arrangement shown in FIG. 9;

FIG. 13 shows the lens-group moving paths for the first and second embodiments; and FIG. 14 shows the lens-group moving paths for the third embodiment.

DESCRIPTION OF THE PREFERRED EMBODIMENTS

Figure 1:
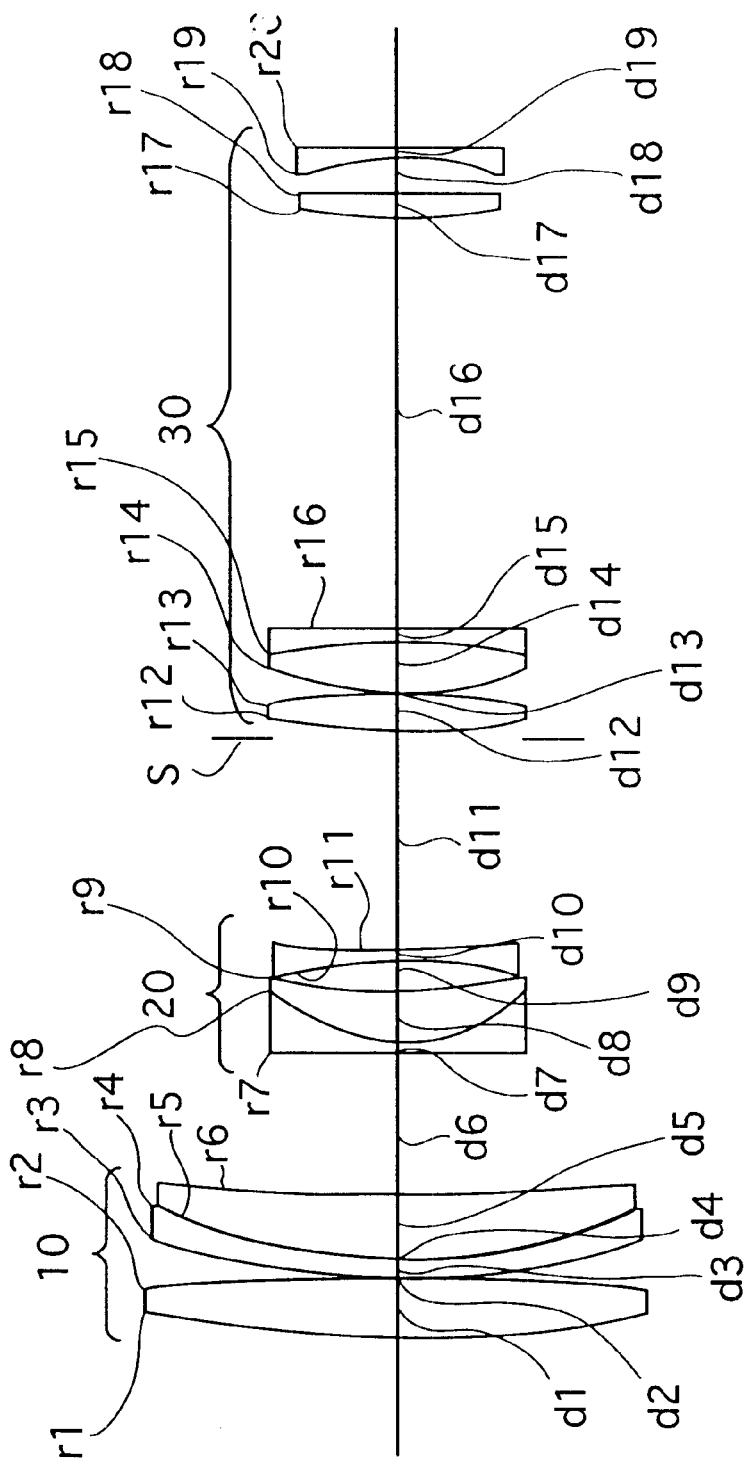
FIG. 1 is a lens arrangement of a zoom lens system according to a first embodiment of the present invention.
Figure 2:
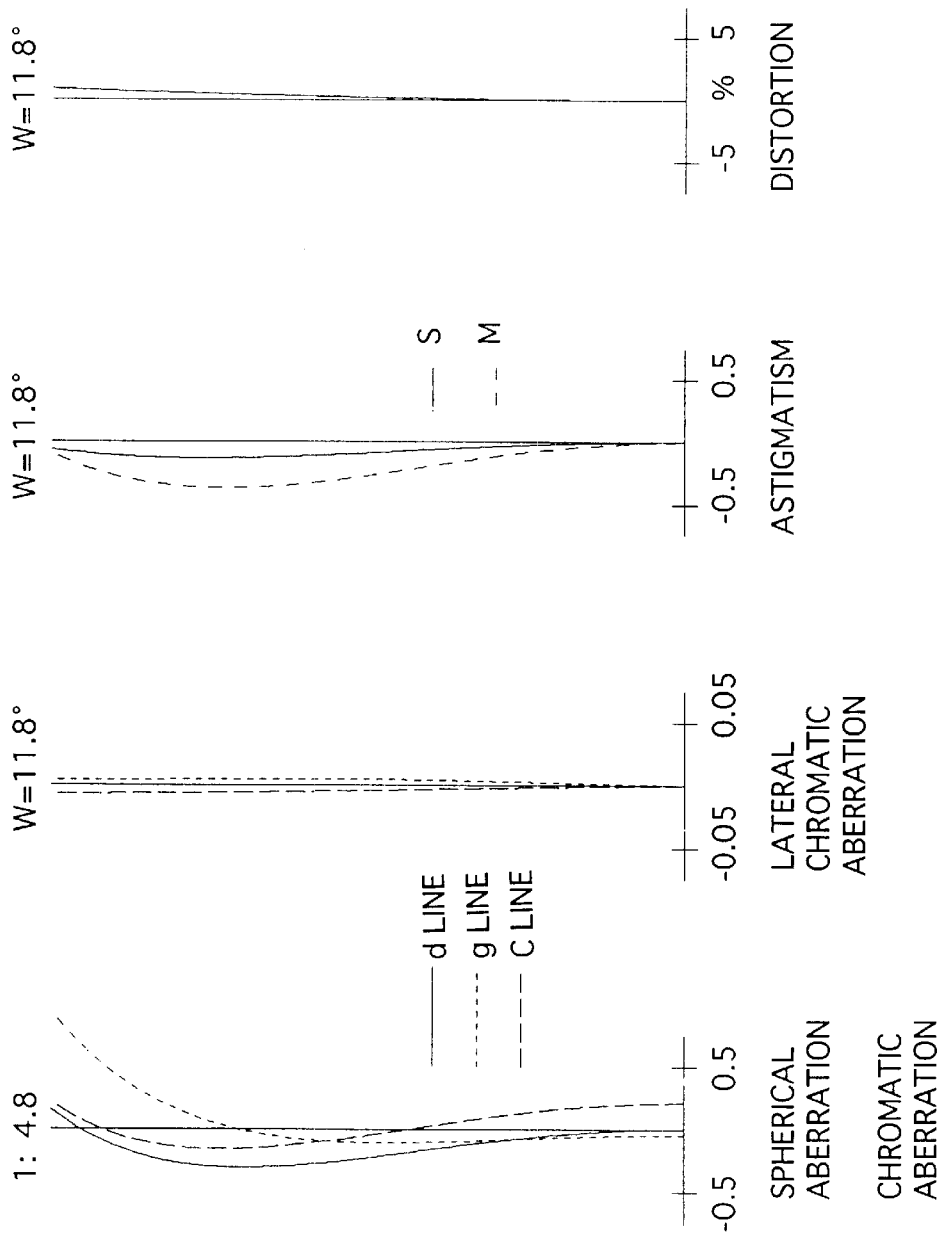
FIGS. 2A, 2B, 2C and 2D show aberrations, at the short focal length extremity, occurred in the lens arrangement shown in FIG. 1.
Figure 3:
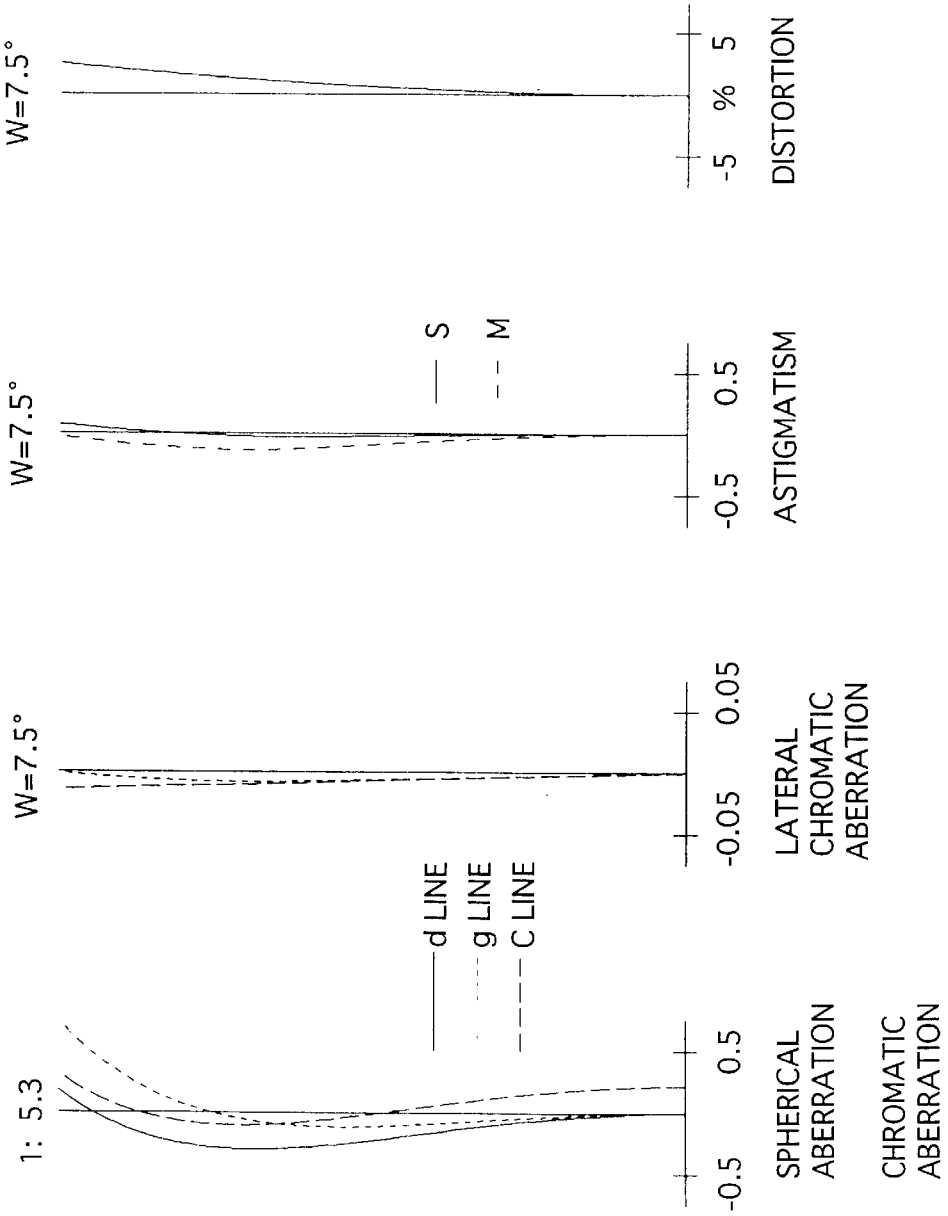
FIGS. 3A, 3B, 3C and 3D show aberrations, at an intermediate focal length, of the lens arrangement shown in FIG. 1.
Figure 4:
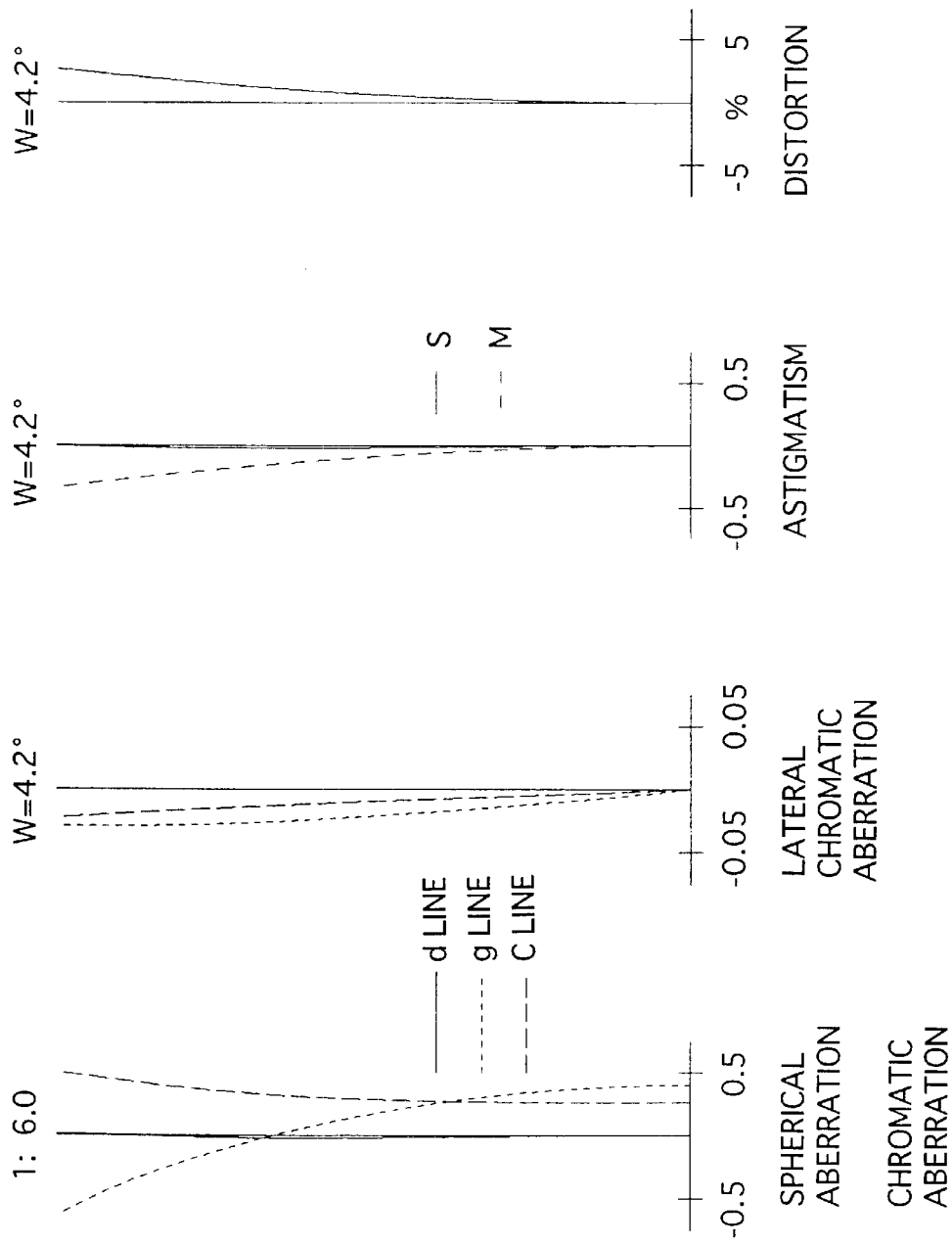
FIGS. 4A, 4B, 4C and 4D show aberrations, at the long focal length extremity, of the lens arrangement shown in FIG. 1.

As shown in the lens-group moving paths of FIGS. 13 and 14, the zoom lens system of the present invention includes a positive first lens group 10, a negative second lens group 20, and a positive third lens group 30, in this order from the object. Upon zooming from the short focal length extremity towards the long focal length extremity, at least the first lens group 10 and the third lens group 30 are arranged to be moved so that the distance between the first lens group 10 and the second lens group 20 increases, and the distance between the second lens group 20 and the third lens group 30 decreases. As shown in FIG. 13, the second lens group 20 is made stationary upon zooming; on the other hand, as shown in FIG. 14, the second lens group 20 moves towards the image upon zooming from the short focal length extremity towards the long focal length extremity. A diaphragm S is provided between the second lens group 20 and the third lens group 30, and moves together with the third lens group 30.

Condition (1) specifies the refractive power (hereinafter, power) of the first lens group 10. By satisfying this condition, the overall length of the zoom lens system can be made short.

If fw/fl exceeds the lower limit of condition (1), the power of the first lens group 10 becomes too weak, so that the overall length of the zoom lens system becomes long and the traveling distance of the first lens group 10 upon zooming is long, which is not suitable for miniaturization of the zoom lens system.

If fw/fl exceeds the upper limit of condition (1), the power of the first lens group 10 becomes too strong, aberrations, such as coma and astigmatism, becomes large, so that the correcting of aberrations in a well-balanced manner is difficult.

Condition (2) specifies the refractive index of the negative lens elements in the second lens group 20.

If N2n exceeds the lower limit of condition (2), the power of the second lens group 20 becomes too weak, so that the second lens group 20 cannot actually contribute to a zooming operation. Consequently, an appropriate zoom ratio cannot be obtained. In addition, reducing the radius of curvature of a lens element in order to maintain the negative power is not preferable, since fluctuations of spherical aberration and astigmatism becomes too large.

If N2n exceeds the upper limit of condition (2), the unit price for the lens material becomes too costly.

Condition (3) specifies the traveling distance of the third lens group 30 upon zooming. By satisfying this condition together with condition (1), the overall length of the zoom lens system can be made short, and each of the second lens group 20 and the third lens group 30 can appropriately be arranged to contribute to zooming operation, i.e., the zooming operation is suitably shared by these lens groups.

If X3/fw exceeds the lower limit of condition (3), the traveling distance of the third lens group 30 becomes short, so that contribution of the third lens group 30 to zooming operation is reduced. As a result, contribution of the second lens group 20 to zooming operation increases. Consequently, if an attempt is made to sufficiently correct aberrations, the number of lens elements in the second lens group 20 has to be increased.

If X3/fw exceeds the upper limit of condition (3), the traveling distance of the third lens group 30 becomes long, thereby the distance between the second lens group 20 and the third lens group 30 has to be made long. As a result the overall length of the zoom lens system becomes long. Further, the position of the exit pupil largely fluctuates, so that the change in the F-number is undesirably increased.

Condition (4) specifies the ratio of the traveling distance, upon zooming, of the first lens group 10 to that of the second lens group 20. In the case where the second lens group 20 is stationary upon zooming as shown in FIG. 13, both X2 and X2/X1 are zero, which means that the stationary second lens group 20 satisfies condition (4), i.e., the value of zero is within the range of condition (4).

If X2/X1 exceeds the lower limit of condition (4), the traveling distance of the second lens group 20 which moves in a direction opposite to that of the first lens group 10 becomes long. This way of moving is advantageous for the second lens group 20 to perform zooming operation; however fluctuations of aberrations upon zooming becomes too large.

If X2/X1 exceeds the upper limit of condition (4), the traveling distance of each lens group becomes long, and the structure of the lens frame is complicated, which arises difficulties in miniaturization of the zoom lens system.

Furthermore, since the lens arrangement of the zoom lens system according to the present invention is simple, it tends to be difficult to eliminate aberrations occurred in the first lens group 10 by a lens group positioned on the image side with respect to the first lens group 10. Therefore the first lens group 10 is preferably constituted by a three-lens-element arrangement including a positive single lens element, a negative single lens element and a positive single lens element, in this order from the object. This is because, in the case of a two-lens-element arrangement including a negative lens element and a positive lens element, it is, in particular, difficult to correct spherical aberration, coma and axial chromatic aberration at the same time in an well-balanced manner at the long focal length extremity. Still further, in order to reduce the change in aberrations at a short photographing distance upon focusing by the first lens group 10, a three-lens-element arrangement is preferable. On the other hand, in the case where more than four lens elements are employed in the first lens group 10, the production cost of the lens elements becomes high, since the diameters of the lens elements are large. In addition, in the above three-lens-element arrangement, the negative second single lens element and the positive third single lens elements from the object can be formed as cemented lens elements.

Condition (5) specifies the Abbe number of the positive lens elements in the first lens group 10 under the condition that the first lens group 10 is constituted by a three-lens-element arrangement, as explained above, including a positive single lens element, a negative single lens element and a positive single lens element, in this order from the object.

If v1p exceeds the lower limit of condition (5), axial chromatic aberration is undercorrected, at the long focal length extremity.

The positive third lens group 30 can reduce the overall length thereof by providing a negative meniscus lens element, as the most image-side lens element therein, having a concave surface facing towards the object so that the third lens group 30 is formed as a telephoto type lens system.

Condition (6) specifies the power of the third lens group 30 and that of the most image-side lens element therein under the condition that the most image-side lens element is a negative meniscus lens element having a concave surface facing towards the object.

If f3/f3end exceeds the lower limit of condition (6), the negative power of the most image-side lens element, i.e., a negative meniscus lens element, becomes weak, so that the effects of the telephoto type lens system is reduced, thereby the overall length of the third lens group 30 becomes long.

If f3/f3end exceeds the upper limit of condition (6), the negative power of the most image-side lens element, i.e., a negative meniscus lens element becomes too strong, so that aberrations, such as spherical aberration and the like, largely occur.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. In the tables, Fno designates the F-number, f designates the focal length of the entire zoom lens system, m designates the transverse magnification, W designates the half angle-of-view (°), $f_B$ designates the back focal distance, r designates the radius of curvature, d designates the lens-element thickness or distance between lens elements, Nd designates the refractive index at the d-line, and v designates the Abbe number.

[Embodiment 1]

FIG. 1 is a lens arrangement of a zoom lens system according to the first embodiment of the present invention. FIGS. 2A through 2D show aberrations, at the short focal length extremity, occurred in the lens arrangement shown in FIG. 1. FIGS. 3A through 3D show aberrations, at an intermediate focal length, of the lens arrangement shown in FIG. 1. FIGS. 4A through 4D show aberrations, at the long focal length extremity, of the lens arrangement shown in FIG. 1. Table 1 shows the numerical data thereof. The first lens group 10 includes a positive single lens element, a negative single lens element, and a positive single lens element, in this order from the object. The second lens group 20 includes cemented lens elements constituted by a negative lens element and a positive lens element, and a negative lens element, in this order from the object. The third lens group 30 includes a positive lens element, cemented lens elements constituted by a positive lens element and a negative lens element, a positive lens element, and a negative meniscus lens element having a concave surface facing towards the object, in this order from the object. In the first embodiment, upon zooming, the first lens group 10 and the third lens group 30 are arranged to be moved, while the second lens group 20 remains stationary, as shown in FIG. 13.

TABLE 1

$F_{NO} = 1:4.8-5.3-6.0$
f = 103.00-160.00-290.04 (zoom ratio: 2.82)
W = 11.8-7.5-4.2
$f_B$ = 49.71-57.08-69.77

| Surface No. | r | d | Nd | v |
| --- | --- | --- | --- | --- |
| 1 | 146.860 | 5.672 | 1.48749 | 70.2 |
| 2 | −310.301 | 0.150 | — | — |
| 3 | 83.006 | 1.900 | 1.80518 | 25.4 |
| 4 | 56.948 | 0.184 | — | — |
| 5 | 57.774 | 6.301 | 1.48749 | 70.2 |
| 6 | 219.852 | 14.662-37.585-58.142 | — | — |
| 7 | 547.113 | 1.400 | 1.74400 | 44.8 |
| 8 | 18.043 | 5.271 | 1.80518 | 25.4 |
| 9 | 57.829 | 2.684 | — | — |
| 10 | −53.299 | 1.300 | 1.80400 | 46.6 |
| 11 | 141.758 | 21.956-14.585-1.900 | — | — |
| Diaphragm | ∞ | 0.750 | — | — |
| 12 | 75.674 | 3.777 | 1.65160 | 58.5 |
| 13 | −75.674 | 0.100 | — | — |
| 14 | 35.935 | 5.354 | 1.51633 | 64.1 |
| 15 | −55.726 | 1.300 | 1.84666 | 23.8 |
| 16 | 541.889 | 42.454 | — | — |
| 17 | 65.681 | 2.564 | 1.80518 | 25.4 |
| 18 | −374.379 | 3.329 | — | — |
| 19 | −31.064 | 1.200 | 1.80400 | 46.6 |
| 20 | −277.927 | — | — | — |

[Embodiment 2]

Figure 5:
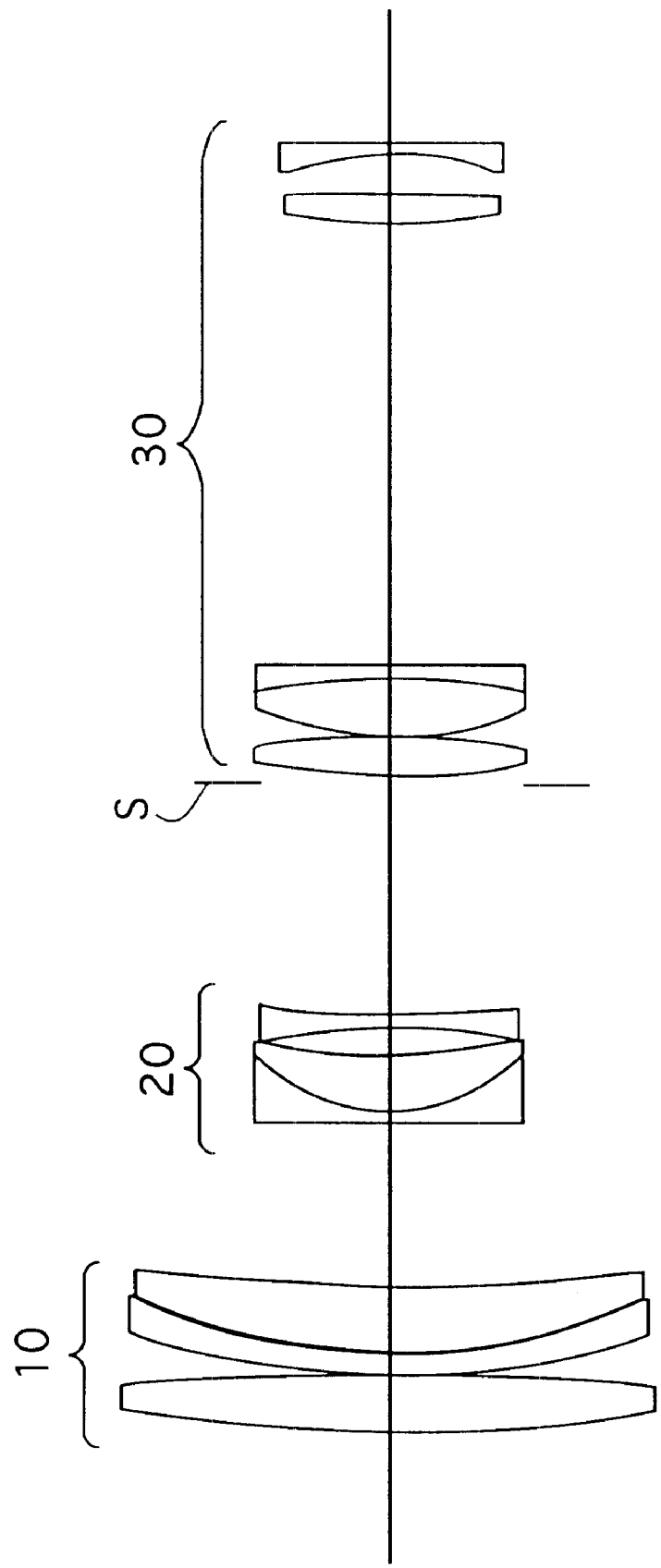
FIG. 5 is a lens arrangement of a zoom lens system according to a second embodiment of the present invention.

FIG. 5 is a lens arrangement of a zoom lens system according to the second embodiment of the present invention. FIGS. 6A through 6D show aberrations, at the short focal length extremity, occurred in the lens arrangement shown in FIG. 5. FIGS. 7A through 7D show aberrations, at an intermediate focal length, of the lens arrangement shown in FIG. 5. FIGS. 8A through 8D show aberrations, at the long focal length extremity, of the lens arrangement shown in FIG. 5. Table 2 shows the numerical data thereof. The basic lens arrangement and the movement of the lens groups is the same as the first embodiment.

TABLE 2

$F_{NO} = 1:4.8-5.3-6.0$
f = 102.50-160.00-290.00 (zoom ratio: 2.83)
W = 11.8-7.5-4.2
$f_B$ = 48.81-56.24-68.88

| Surface No. | r | d | Nd | v |
| --- | --- | --- | --- | --- |
| 1 | 156.500 | 5.410 | 1.48749 | 70.2 |
| 2 | −288.139 | 0.150 | — | — |
| 3 | 81.063 | 1.900 | 1.80518 | 25.4 |
| 4 | 56.405 | 0.150 | — | — |
| 5 | 57.150 | 6.330 | 1.48749 | 70.2 |
| 6 | 205.000 | 15.326-38.518-59.068 | — | — |
| 7 | 540.000 | 1.400 | 1.74400 | 44.8 |

TABLE 2-continued $F_{NO}$ = 1:4.8-5.3-6.0
f = 102.50-160.00-290.00 (zoom ratio: 2.83)
W = 11.8-7.5-4.2
$f_B$ = 48.81-56.24-68.88

| Surface No. | r | d | Nd | ν |
|---|---|---|---|---|
| 8 | 18.140 | 5.200 | 1.80518 | 25.4 |
| 9 | 57.150 | 2.680 | — | — |
| 10 | −52.780 | 1.300 | 1.80400 | 46.6 |
| 11 | 149.380 | 21.970-14.541-1.904 | — | — |
| Diaphragm | ∞ | 0.750 | — | — |
| 12 | 76.530 | 3.730 | 1.65160 | 58.5 |
| 13 | −76.530 | 0.100 | — | — |
| 14 | 36.450 | 5.440 | 1.51633 | 64.1 |
| 15 | −54.532 | 1.300 | 1.84666 | 23.8 |
| 16 | 784.000 | 42.480 | — | — |
| 17 | 66.762 | 2.500 | 1.78472 | 25.7 |
| 18 | −334.410 | 3.930 | — | — |
| 19 | −30.621 | 1.200 | 1.80400 | 46.6 |
| 20 | −224.400 | — | — | — |

[Embodiment 3]

Figure 9:
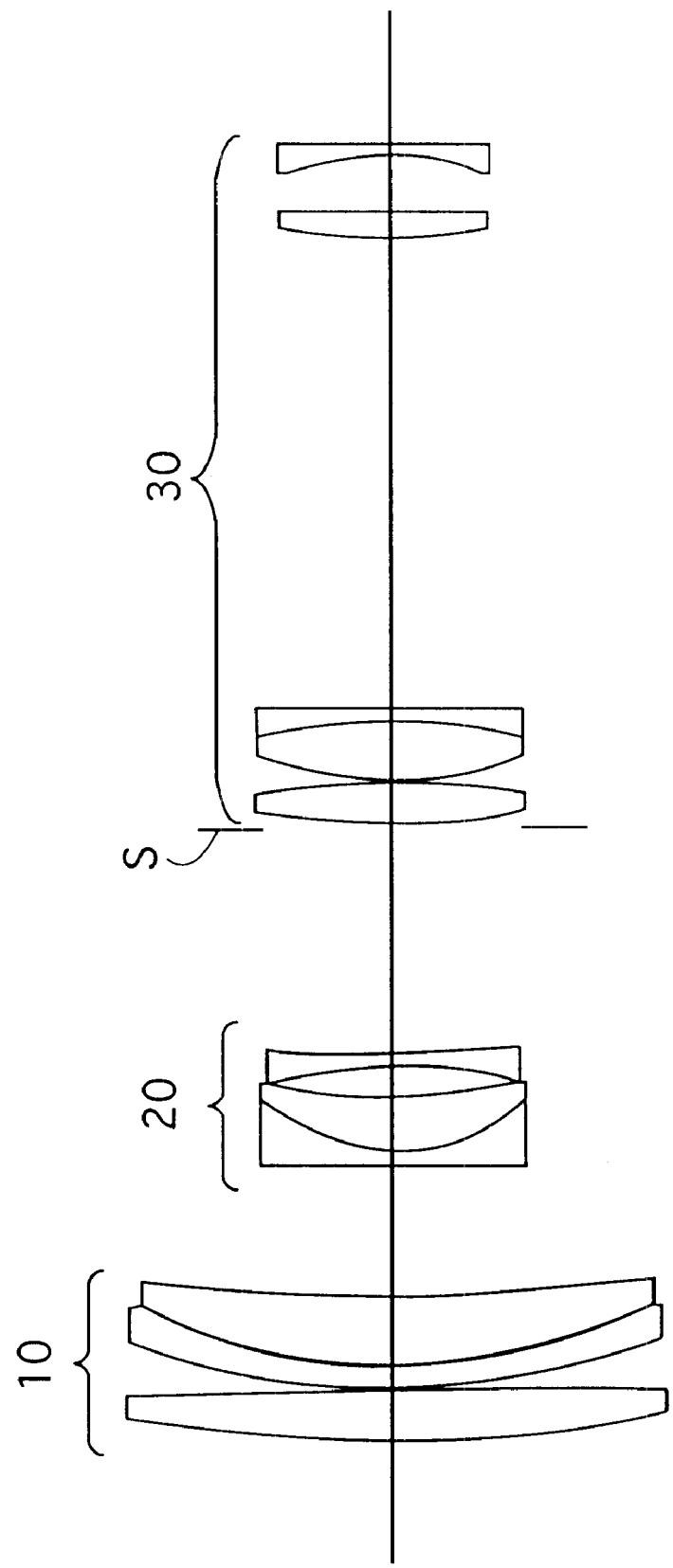
FIG. 9 is a lens arrangement of a zoom lens system according to a third embodiment of the present invention.

FIG. 9 is a lens arrangement of a zoom lens system according to the third embodiment of the present invention. FIGS. 10A through 10D show aberrations, at the short focal length extremity, occurred in the lens arrangement shown in FIG. 9. FIGS. 11A through 11D show aberrations, at an intermediate focal length, of the lens arrangement shown in FIG. 9. FIGS. 12A through 12D show aberrations, at the long focal length extremity, of the lens arrangement shown in FIG. 9. Table 3 shows the numerical data thereof. The basic lens arrangement and the movement of the lens groups is the same as the first embodiment. In the third embodiment, upon zooming, all the lens groups including the second lens group 20 are arranged to move along the optical axis, as shown in FIG. 14.

TABLE 3

$F_{NO}$ = 1:5.0-5.3-6.0
f = 102.42-160.00-290.07 (zoom ratio: 2.83)
W = 11.8-7.5-4.2
$f_B$ = 48.49-54.38-66.45

| Surface No. | r | d | Nd | ν |
|---|---|---|---|---|
| 1 | 139.347 | 5.197 | 1.58913 | 61.2 |
| 2 | −478.578 | 0.150 | — | — |
| 3 | 83.061 | 1.900 | 1.80518 | 25.4 |
| 4 | 54.464 | 0.070 | — | — |
| 5 | 54.468 | 6.700 | 1.48749 | 70.2 |
| 6 | 210.447 | 12.204-35.840-55.250 | — | — |
| 7 | 1178.073 | 1.400 | 1.75700 | 47.8 |
| 8 | 18.519 | 5.156 | 1.80518 | 25.4 |
| 9 | 54.712 | 2.874 | — | — |
| 10 | −53.204 | 1.300 | 1.81600 | 46.6 |
| 11 | 199.760 | 21.654-14.488-1.900 | — | — |
| Diaphragm | ∞ | 0.700 | — | — |
| 12 | 87.934 | 3.808 | 1.65160 | 58.5 |
| 13 | −71.389 | 0.100 | — | — |
| 14 | 36.318 | 5.740 | 1.48749 | 70.2 |
| 15 | −52.914 | 1.300 | 1.84666 | 23.8 |
| 16 | −1241.163 | 45.164 | — | — |
| 17 | 72.009 | 2.412 | 1.78472 | 25.7 |
| 18 | −341.737 | 5.289 | — | — |
| 19 | −31.146 | 1.200 | 1.80400 | 46.6 |
| 20 | −186.190 | — | — | — |

Table 4 shows the numerical values for each condition of each embodiment.

TABLE 4

| | Embod. 1 | Embod. 2 | Embod. 3 |
|---|---|---|---|
| Condition (1) | 0.704 | 0.696 | 0.736 |
| Condition (2) | 1.774 | 1.774 | 1.787 |
| Condition (3) | 0.195 | 0.196 | 0.175 |
| Condition (4) | 0.000 | 0.000 | −0.044 |
| Condition (5) | 70.2 | 70.2 | 65.7 |
| Condition (6) | −0.803 | −0.788 | −0.735 |

As can be understood from the above, each embodiment satisfies each condition; and according to the aberration diagrams, the various aberrations are relatively well corrected.

According to the above description, a miniaturized telephoto zoom lens system, which has a zoom ratio of about 2.5 to 3.0, the angle of view of less than 10° at the long focal length extremity, a simple structure, and is produced at a low cost, can be obtained.

What is claimed is:

1. A zoom lens system comprising a positive first lens group, a negative second lens group, and a positive third lens group, in this order from an object, wherein at least said first lens group and said third lens group are moved along the optical axis to perform zooming;

wherein said second lens group comprises at least one negative lens element; and wherein said zoom lens system satisfies the following relationships:

0.696≦fw/f1 <0.80

1.73<N2n<1.85

0.15<X3/fw<0.21

−0.05<X2/X1 <0.10 wherein fw designates the focal length of the entire zoom lens system at the short focal length extremity;

f1 designates the focal length for said first lens group;

N2n designates the average refractive index, with respect to the d-line, of negative lens elements in said second lens group;

X3 designates the traveling distance, upon zooming, of said third lens group from the short focal length extremity towards the long focal length extremity, when the direction from the image plane towards said object is defined as the positive direction;

X2 designates the traveling distance, upon zooming, of the second lens group from the short focal length extremity to the long focal length extremity, when the direction from the image plane towards said object is defined as the positive direction; and X1 designates the traveling distance, upon zooming, of the first lens group from the short focal length extremity to the long focal length extremity, under the direction from the image plane towards said object is defined as the positive direction.

2. The zoom lens system according to claim 1, wherein said second lens group is made stationary upon zooming.

3. The zoom lens system according to claim 1, wherein said first lens group comprises a positive single lens element, a negative single lens element and a positive single lens element, in this order from said object; and wherein said first lens group satisfies the following condition:

62<ν1p wherein

ν1p designates the average Abbe number of said positive lens elements in said first lens group.

4. The zoom lens system according to claim 1, wherein the most image-side lens element in said third lens group comprises a negative meniscus lens element having the concave surface facing towards said object, and wherein said third lens group and said most image-side lens element satisfy the following condition:

−0.90<f3/f3end<−0.65 wherein f3 designates the focal length of said third lens group; and f3end designates the focal length of said most image-side lens element in said third lens group.

5. The zoom lens system according to claim 2, wherein said first lens group comprises a positive single lens element, a negative single lens element and a positive single lens element, in this order from said object; and wherein said first lens group satisfies the following condition:

62<ν1p wherein

ν1p designates the average Abbe number of said positive lens elements in said first lens group.

6. The zoom lens system according to claim 2, wherein the most image-side lens element in said third lens group comprises a negative meniscus lens element having the concave surface facing towards said object, and wherein said third lens group and said most image-side lens element satisfy the following condition:

−0.90<f3/f3end<−0.65 wherein f3 designates the focal length of said third lens group; and f3end designates the focal length of said most image-side lens element in said third lens group.

7. The zoom lens system according to claim 3, wherein the most image-side lens element in said third lens group comprises a negative meniscus lens element having the concave surface facing towards said object, and wherein said third lens group and said most image-side lens element satisfy the following condition:

−0.90<f3/f3end<−0.65 wherein f3 designates the focal length of said third lens group; and f3end designates the focal length of said most image-side lens element in said third lens group.

8. The zoom lens system according to claim 1, wherein upon zooming from the short focal length extremity towards the long focal length extremity, said second lens group is moved, along the optical axis, in a direction from said object towards the image plane.

9. A zoom lens system comprising a positive first lens group, a negative second lens group, and a positive third lens group, in this order from an object, wherein at least said first lens group and said third lens group are moved along the optical axis to perform zooming;

wherein said first lens group comprises a positive single lens element, a negative single lens element and a positive single lens element, in this order from said object;

wherein said second lens group comprises at least one negative lens element; and wherein said zoom lens system satisfies the following relationships:

0.65<fw/f1 <0.80

1.73<N2 n<1.85

0.15<X3/fw<0.21

−0.05<X2/X1 <0.10

62 <ν1p;

wherein fw designates the focal length of the entire zoom lens system at the short focal length extremity;

f1 designates the focal length of said first lens group;

N2n designates the average refractive index, with respect to the d-line, of negative lens elements in said second lens group;

X3 designates the travelling distance, upon zooming, of said third lens group from the short focal length extremity towards the long focal length extremity, when the direction from the image plane towards said object is defined as the positive direction;

X2 designates the traveling distance, upon zooming, of the second lens group from the short focal length extremity to the long focal length extremity, when the direction from image plane towards said object is defined as the positive direction;

X1 designates the traveling distance, upon zooming, of the first lens group from the short focal length extremity to the long focal length extremity, when the direction from the image plane towards said object is defined as the positive direction; and ν1p designates the average Abbe number of said positive lens elements in said first lens group.

10. A zoom lens system comprising a positive first lens group, a negative second lens group, and a positive third lens group, in this order from an object, wherein at least said first lens group and said third lens group are moved along the optical axis to perform zooming;

wherein said second lens group comprises at least one negative lens element; and wherein said zoom lens system satisfies the following relationships:

0.65<fw/f1 <0.80

1.73<N2 n<1.85

0.15<X3/fw<0.21

−0.05<X2/X1 <0.10

−0.90<f3/f3 end<−0.65 wherein the most image-side lens element in said third lens group comprises a negative meniscus lens element having the concave surface facing towards said object, wherein fw designates the focal length of the entire zoom lens system at the short focal length extremity;

f1 designates the focal length for said first lens group;

N2n designates the average refractive index, with respect to the d-line, of negative lens elements in said second lens group;

X3 designates the traveling distance, upon zooming, of said third lens group from the short focal length extremity towards the long focal length extremity, when the direction from the image plane towards said object is defined as the positive direction;

X2 designates the traveling distance, upon zooming, of the second lens group from the short focal length extremity to the long focal length extremity, when the direction from the image plane towards said object is defined as the positive direction;

X1 designates the traveling distance, upon zooming, of the first lens group from the short focal length extremity to the long focal length extremity, when the direction from the image plane towards said object is defined as the positive direction;

f3 designates the focal length of said third lens group; and f3 end designates the focal length of said most image-side lens element in said third lens group.

11. A zoom lens system consisting of a positive first lens group, a negative second lens group, and a positive third lens group, in this order from an object, wherein at least said first lens group and said third lens group are moved along the optical axis to perform zooming;

wherein said second lens group comprises at least one negative lens element; and wherein said zoom lens system satisfies the following relationships:

$0.65 < fw/f1 < 0.80$ $1.73 < N2\,n < 1.85$ $0.15 < X3/fw < 0.21$ $-0.05 < X2/X1 < 0.10$ wherein fw designates the focal length of the entire zoom lens system at the short focal length extremity;

f1 designates the focal length for said first lens group;

N2n designates the average refractive index, with respect to the d-line, of negative lens elements in said second lens group;

X3 designates the traveling distance, upon zooming, of said third lens group from the short focal length extremity towards the long focal length extremity, when the direction from the image plane towards said object is defined as the positive direction;

X2 designates the traveling distance, upon zooming, of the second lens group from the short focal length extremity to the long focal length extremity, when the direction from the image plane towards said object is defined as the positive direction; and X1 designates the traveling distance, upon zooming, of the first lens group from the short focal length extremity to the long focal length extremity, when the direction from the image plane towards said object is defined as the positive direction.

12. The zoom lens system according to claim 9, wherein most image-side lens element in said third lens group comprises a negative meniscus lens element having the concave surface facing towards said object, and wherein said third lens group and said most image-side lens element satisfy the following relationship:

$-0.90 < f3/f3\,end < -0.65$ wherein f3 designates the focal length of said third lens group; and f3 end designates the focal length of said most image-side lens element in said third lens group.

* * * * *